(12) United States Patent
Sheridan

(10) Patent No.: US 11,686,209 B2
(45) Date of Patent: Jun. 27, 2023

(54) FAN DRIVE GEAR SYSTEM WITH IMPROVED MISALIGNMENT CAPABILITY

(71) Applicant: Raytheon Technologies Corporation, Farmington, CT (US)

(72) Inventor: William G. Sheridan, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 8 days.

(21) Appl. No.: 17/213,444

(22) Filed: Mar. 26, 2021

(65) Prior Publication Data
US 2021/0215060 A1 Jul. 15, 2021

Related U.S. Application Data

(63) Continuation of application No. 16/208,907, filed on Dec. 4, 2018, now Pat. No. 11,008,885, which is a
(Continued)

(51) Int. Cl.
*F02C 7/36* (2006.01)
*F01D 15/12* (2006.01)
(Continued)

(52) U.S. Cl.
CPC ........... *F01D 15/12* (2013.01); *F01D 21/045* (2013.01); *F02C 7/36* (2013.01); *F16H 1/2809* (2013.01); *F16H 1/2818* (2013.01); *F16H 1/2827* (2013.01); *F16H 1/2836* (2013.01); *F16H 1/48* (2013.01); *F05D 2220/32* (2013.01);
(Continued)

(58) Field of Classification Search
CPC .. F02C 7/36; F01D 15/12; F05D 2260/40311; F16H 1/2818; F16H 1/2827; F16H 1/48
See application file for complete search history.

(56) References Cited

U.S. PATENT DOCUMENTS 2,460,629 A 2/1949 Fawick
2,749,778 A 6/1956 Kuhn
(Continued)

FOREIGN PATENT DOCUMENTS

EP 2644939 10/2013
FR 1365270 7/1964
(Continued)

OTHER PUBLICATIONS

International Search Report and Written Opinion for PCT/US2014/035412 dated Aug. 14, 2014.
(Continued)

*Primary Examiner* — Erin D Bishop
(74) *Attorney, Agent, or Firm* — Carlson, Gaskey & Olds, P.C.

(57) ABSTRACT

An epicyclic gear assembly includes a carrier that includes a first plate axially spaced from a second plate. At least one epicyclic gear set is located between the first plate and the second plate. The first plate is configured to rotate with an output of the epicyclic gear assembly. A first bearing race is attached to the first plate for supporting a first bearing. A second bearing race is attached to the second plate for supporting a second bearing.

12 Claims, 5 Drawing Sheets

Related U.S. Application Data continuation of application No. 14/785,768, filed as application No. PCT/US2014/035412 on Apr. 25, 2014, now Pat. No. 10,145,259.

(60) Provisional application No. 61/820,781, filed on May 8, 2013.

(51) Int. Cl.
    *F16H 1/28*     (2006.01)
    *F01D 21/04*     (2006.01)
    *F16H 1/48*     (2006.01)

(52) U.S. Cl.
    CPC ............... *F05D 2260/40311* (2013.01); *F16H 2001/289* (2013.01)

(56) References Cited

U.S. PATENT DOCUMENTS

| | | | |
|---|---|---|---|
| 3,352,178 | A | 11/1967 | Lindgren et al. |
| 3,776,067 | A | 12/1973 | DeBruyne et al. |
| 3,974,718 | A | 8/1976 | Kylberg |
| 4,700,583 | A | 10/1987 | Hicks |
| 5,098,359 | A | 3/1992 | Chales et al. |
| 5,558,593 | A | 9/1996 | Roder et al. |
| 5,679,089 | A | 10/1997 | Leverdahl |
| 6,409,414 | B1 | 6/2002 | Altamura et al. |
| 7,056,259 | B2 | 6/2006 | Fox |
| 7,297,086 | B2 | 11/2007 | Fox |
| 7,806,799 | B2 | 10/2010 | Smook et al. |
| 8,172,717 | B2 | 5/2012 | Lopez et al. |
| 8,672,801 | B2 * | 3/2014 | McCune ............... F01D 25/164 475/331 |
| 8,968,148 | B2 | 3/2015 | Matsuoka et al. |
| 2003/0073537 | A1 | 4/2003 | Lloyd |
| 2008/0194378 | A1 | 8/2008 | Fox |
| 2009/0090096 | A1 | 4/2009 | Sheridan |
| 2009/0111639 | A1 | 4/2009 | Klingels |
| 2010/0197445 | A1 | 8/2010 | Montestruc |
| 2010/0303626 | A1 | 12/2010 | Mostafl |
| 2011/0053730 | A1 | 3/2011 | Fox et al. |
| 2012/0028754 | A1 | 2/2012 | Lopez et al. |
| 2012/0028756 | A1 | 2/2012 | Lopez et al. |
| 2012/0045336 | A1 | 2/2012 | Castell |
| 2012/0316027 | A1 | 12/2012 | Erno et al. |
| 2013/0310213 | A1 | 11/2013 | Matsuoka et al. |

FOREIGN PATENT DOCUMENTS

| | | |
|---|---|---|
| WO | 2011130360 | 10/2011 |
| WO | 2012070199 | 5/2012 |

OTHER PUBLICATIONS

International Preliminary Report on Patentablity for PCT Application No. PCT/US2014/035412, dated Nov. 19, 2015.
Extended European Search Report for European Application No. 14795461.4 dated Mar. 31, 2016.
Misel, O.W. (1977). QCSEE main reduction gears test program. NASA CR-134669. Mar. 1, 1977. pp. 1-222.
QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
QCSEE over-the-wing final design report. (1977). NASA-CR-134848. Jun. 1, 1977. pp. 1-503.
QCSEE main reduction gears bearing development program final report. (1975). NASA-CR-134890. Dec. 1, 1975. pp. 1-41.
QCSEE under-the-wing engine composite fan blade final design test report. (1977). NASA-CR-135046. Feb. 1, 1977. pp. 1-55.
QCSEE over-the-wing propulsion system test report vol. III—mechanical performance. (1978). NASA-CR-135325. Feb. 1, 1978. pp. 1-112.
QCSEE ball spline pitch-change mechanism whirligig test report. (1978). NASA-CR-135354. Sep. 1, 1978. pp. 1-57.
Quiet clean general aviation turbofan (QCGAT) technology study final report vol. 1. (1975). NASA-CR-164222. Dec. 1, 1975. pp. 1-186.
Neitzel, R.E., Hirschkron, R. and Johnston, R.P. (1976). Study of unconventional aircraft engines designed for low energy consumption. NASA-CR-135136. Dec. 1, 1976. pp. 1-153.
Neitzel, R., Lee, R., and Chamay, A.J. (1973). Engine and installation preliminary design. Jun. 1, 1973. pp. 1-333.
Anderson, R.D. (1985). Advanced Propfan Engine Technology (APET) definition study, single and counter-rotation gearbox/pitch change mechanism design. NASA CR-168115. Jul. 1, 1985. pp 1-289.
Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.
Gliebe, P.R., Ho, P.Y., and Mani, R. (1995). UHB engine fan and broadband noise reduction study. NASA CR-198357. Jun. 1995. pp. 1-48.
Holcombe, V. (2003). Aero-Propulsion Technology (APT) task V low noise ADP engine definition study. NASA CR-2003-212521. Oct. 1, 2003. pp. 1-73.
Sutliff, D. (2005). Rotating rake turbofan duct mode measurement system. NASA TM-2005-213828. Oct. 1, 2005. pp. 1-34.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
NASA Conference Publication. (1978). CTOL transport technology. NASA-CP-2036-PT-1. Jun. 1, 1978. pp. 1-531.
Johnston, R.P., Hirschkron, R., Koch, C.C., Neitzel, R.E., and Vinson, P.W. (1978). Energy efficient engine: Preliminary design and integration study-final report. NASA CR-135444. Sep. 1978. pp. 1-401.
Johnston, R.P. and Hemsworth, M.C. (1978). Energy efficient engine preliminary design and integration studies. Jun. 1, 1978. pp. 1-28.
Awker, R.W. (1986). Evaluation of propfan propulsion applied to general aviation. NASA CR-175020. Mar. 1, 1986. pp. 1-140.
Howe, D.C. and Wynosky, T.A. (1985). Energy efficient engine program advanced turbofan nacelle definition study. NASA CR-174942. May 1, 1985. pp. 174.
Singh, B. (1986). Small engine component technology (SECT) study. NASA CR-175079. Mar. 1, 1986. pp. 1-102.
Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp 1-187.
2003 NASA seal/secondary air system workshop. (2003). NASA/CP-2004-212963/vol. 1. Sep. 1, 2004. pp. 1-408.
Berton, J.J. and Guynn, M.D. (2012). Multi-objective optimization of a turbofan for an advanced, single-aisle transport. NASA/TM-2012-217428. pp. 1-26.
Chapman, J.W. and Litt, J.S. (2017). Control design for an advanced geared turbofan engine. AIAA Joint Propulsion Conference 2017. Jul. 10, 2017-Jul. 12, 2017. Atlanta, GA. pp. 1-12.
Dalton, III., W.N. (2003). Ultra high bypass ratio low noise engine study. NASA/CR-2003-212523. Nov. 2003. pp. 1-187.
Edkins, D.P., Hirschkron, R., and Lee, R. (1972). TF34 turbofan quiet engine study. Final Report prepared for NASA. NASA-CR-120914. Jan. 1, 1972. pp. 1-99.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.

(56) References Cited

OTHER PUBLICATIONS

Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.

Guynn, M.D., Berton, J.J., Fisher, K.L., Haller, W.J., Tong, M. T., and Thurman, D.R. (2009). Analysis of turbofan design options for an advanced single-aisle transport aircraft. American Institute of Aeronautics and Astronautics. pp. 1-13.

Mavris, D.N., Schutte, J.S. (2016). Application of deterministic and probabilistic system design methods and enhancements of conceptual design tools for ERA project final report. NASA/CR-2016-219201. May 1, 2016. pp. 1-240.

Mccracken, R.C. (1979). Quiet short-haul research aircraft familiarization document. NASA-TM-81149. Nov. 1, 1979. pp 1-76.

Litt, J.S. (2018). Sixth NASA Glenn Research Center propulsion control and diagnostics (PCD) workshop. NASA/CP-2018-219891. Apr. 1, 2018. pp. 1-403.

Rotordynamic instability problems in high-performance turbomachinery. (1986). NASA conference publication 2443. Jun. 2-4, 1986.

Sargisson, D.F. (1985). Advanced propfan engine technology (APET) and single-rotation gearbox/pitch change mechanism. NASA Contractor Report-168113. R83AEB592. Jun. 1, 1985. pp. 1-476.

Singh, R. and Houser, D.R. (1990). Non-linear dynamic analysis of geared systems. NASA-CR-180495. Feb. 1, 1990. pp. 1-263.

Smith, C.E., Hirschkron, R., and Warren, R.E. (1981). Propulsion system study for small transport aircraft technology (STAT). Final report. NASA-CR-165330. May 1, 1981. pp. 1-216.

Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.

\* cited by examiner

FAN DRIVE GEAR SYSTEM WITH IMPROVED MISALIGNMENT CAPABILITY

CROSS-REFERENCE TO RELATED APPLICATIONS

This disclosure is a continuation of U.S. patent application Ser. No. 16/208,907 filed Dec. 4, 2018, which is a continuation of U.S. patent application Ser. No. 14/785,768 filed Oct. 20, 2015, now issued as U.S. Pat. No. 10,145,259, issued Dec. 4, 2018, which is a U.S. National Phase filing of PCT Application No. PCT/US2014/035412 filed Apr. 25, 2014, which claims benefit of Provisional Application No. 61/820,781 filed May 8, 2013.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Some gas turbine engines include a geared architecture mechanically connecting the fan section with the turbine section. The geared architecture allows the turbine section to spin at a different rotational speed than the fan section to increase efficiency of the gas turbine engine. During operation, torsional loads are applied to the geared architecture that can deform the structure of the geared architecture. Deformation of the geared architecture structure can misalign the gears and decrease the operating life of the gears and their associated bearings.

SUMMARY

In one exemplary embodiment, an epicyclic gear assembly includes a carrier that includes a first plate axially spaced from a second plate by a connector. A first epicyclic gear set is supported adjacent the first plate and includes a first set of circumferentially offset intermediate gears meshing with a first sun gear and a first ring gear. A second epicyclic gear set is axially spaced from the first epicyclic gear set and supported adjacent the second plate and includes a second set of circumferentially offset intermediate gears meshing with a second sun gear and a second ring gear. The first epicyclic gear is set and the second epicyclic gear set maintain relative intermeshing alignment during flexure-induced deformation of the carrier. The first ring gear includes a first set of teeth that extends from a first flexible flange and the second ring gear includes a second set of teeth that extends from a second flexible flange.

In a further embodiment of any of the above, the first sun gear includes a first set of teeth and the second sun gear includes a second set of teeth. The first set of teeth are clocked to align with a set of tooth roots between the second set of teeth.

In a further embodiment of any of the above, the first set of intermediate gears move independently of the second set of intermediate gears.

In a further embodiment of any of the above, at least one of the first set of intermediate gears is attached to the carrier by at least one first post. At least one of the second set of intermediate gears are attached to the carrier by at least one second post.

In a further embodiment of any of the above, at least one first spherical bearing is located between at least one first post and at least one of the first set of intermediate gears. At least one second spherical bearing is located between at least one second post and at least one second set of intermediate gears.

In a further embodiment of any of the above, the first set of intermediate gears and the second set of intermediate gears are spur gears.

In a further embodiment of any of the above, the gear assembly is a planetary gear assembly with the first ring gear and the second ring gear fixed from rotation.

In a further embodiment of any of the above, the gear assembly is a star gear assembly with the carrier fixed from rotation.

In a further embodiment of any of the above, at least one intermediate gear opening is in the carrier. One of the first set of intermediate gears and one of the second set of intermediate gears are located within the at least one intermediate gear opening.

In a further embodiment of any of the above, the first sun gear is separate from the second sun gear.

In a further embodiment of any of the above, a radially inner side of the first sun gear includes a first splined connection and a radially inner side of the second sun gear includes a splined connection.

In another exemplary embodiment, a gas turbine engine includes a fan section rotatable about an axis. A turbine section has a fan drive turbine. A speed change mechanism is in communication with the fan section. The speed change mechanism includes a carrier that includes a first plate axially spaced from a second plate by at least one connector. A first epicyclic gear set is supported adjacent the first plate and includes a first set of circumferentially offset intermediate gears meshing with a first sun gear and a first ring gear. A second epicyclic gear set is axially spaced from the first set of epicyclic gears and is supported adjacent the second plate and includes a second set of circumferentially offset intermediate gears meshing with a second sun gear and a second ring gear. The first epicyclic gear set and the second epicyclic gear set maintain relative intermeshing alignment during flexure-induced deformation of the carrier. A shaft drives the first sun gear and the second sun gear. The shaft is located axially downstream of the first plate.

In a further embodiment of any of the above, the first ring gear includes a first set of teeth that extend from a first flexible flange. The second ring gear includes a second set of teeth that extend from a second flexible flange.

In a further embodiment of any of the above, the first set of intermediate gears move independently of the second set of intermediate gears.

In a further embodiment of any of the above, at least one of the first set of intermediate gears is attached to the carrier by at least one first post. At least one of the second set of intermediate gears are attached to the carrier by at least one second post.

In a further embodiment of any of the above, at least one first spherical bearing is located between at least one first post and at least one of the first set of intermediate gears. At least one second spherical bearing is located between at least one second post and at least one second set of intermediate gears.

In a further embodiment of any of the above, the first sun gear includes a first set of teeth and the second sun gear includes a second set of teeth. The first set of teeth are clocked to align with a set of tooth roots between the second set of teeth.

In a further embodiment of any of the above, the gear assembly is a planetary gear assembly with the first ring gear and the second ring gear fixed from rotation.

In a further embodiment of any of the above, the gear assembly is a star gear assembly with the carrier fixed from rotation.

In a further embodiment of any of the above, at least one intermediate gear opening is in the carrier. One of the first set of intermediate gears and one of the second set of intermediate gears are located within at last one intermediate gear opening.

In a further embodiment of any of the above, the first set of intermediate gears and the second set of intermediate gears are spur gears.

In a further embodiment of any of the above, the first sun gear is separate from the second sun gear.

In a further embodiment of any of the above, a radially inner side of the first sun gear includes a first splined connection and a radially inner side of the second sun gear includes a splined connection.

The various features and advantages of this disclosure will become apparent to those skilled in the art from the following detailed description. The drawings that accompany the detailed description can be briefly described as follows.

DETAILED DESCRIPTION

Figure 1:
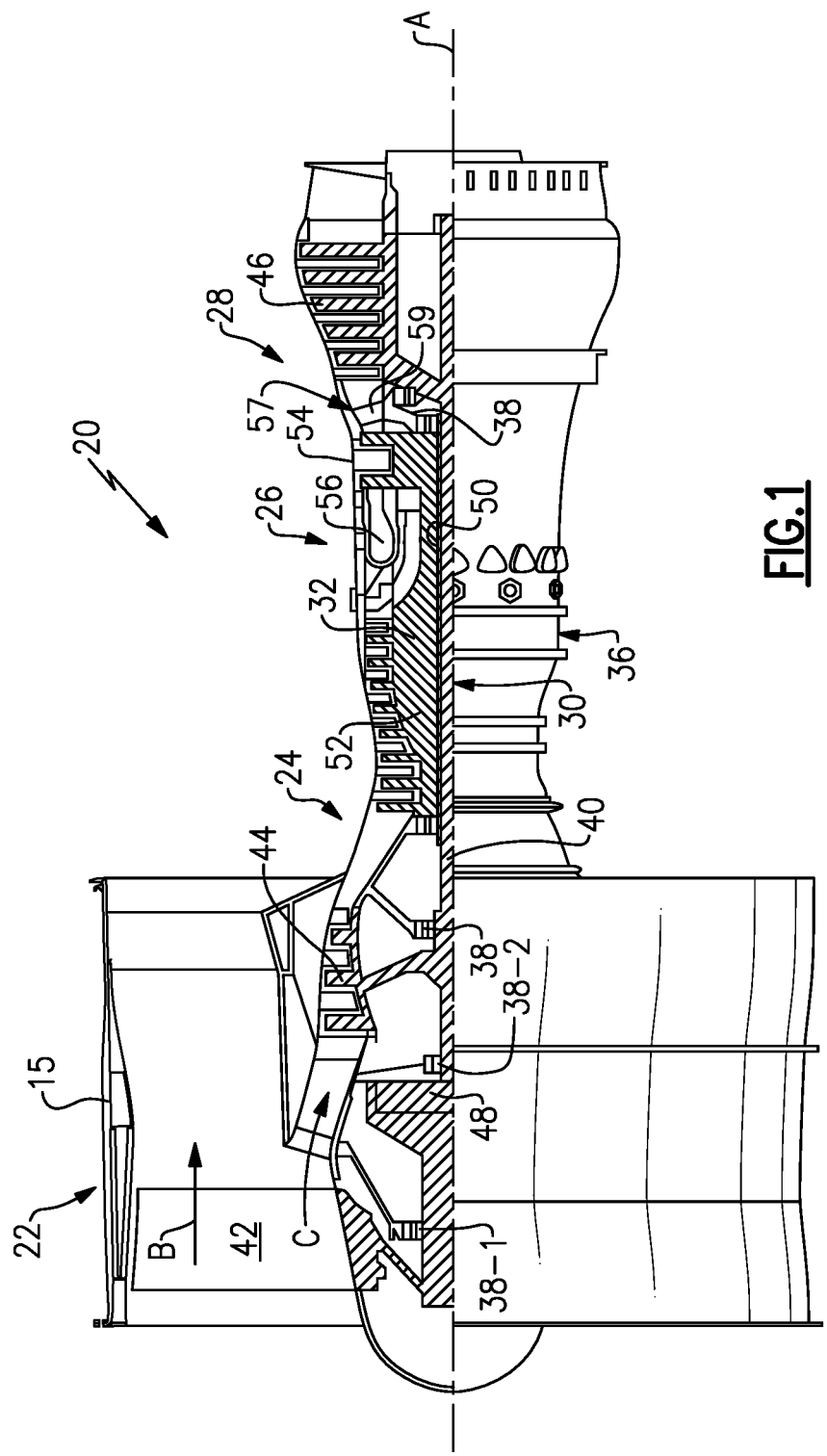
FIG. 1 illustrates a schematic, cross-sectional view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a fan case or fan duct 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, the compressor section 24, the combustor section 26, the turbine section 28, and the geared architecture 48 may be varied. For example, geared architecture 48 may be located aft of the combustor section 26 or even aft of turbine section 28, and fan section 22 may be positioned forward or aft of the location of the geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system, star gear system, or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} °\text{R})/(518.7° \text{R})]^{0.5}$. The "Low corrected fan tip speed" as disclosed herein according to one non-limiting embodiment is less than about 1150 ft/second.

Figure 2:
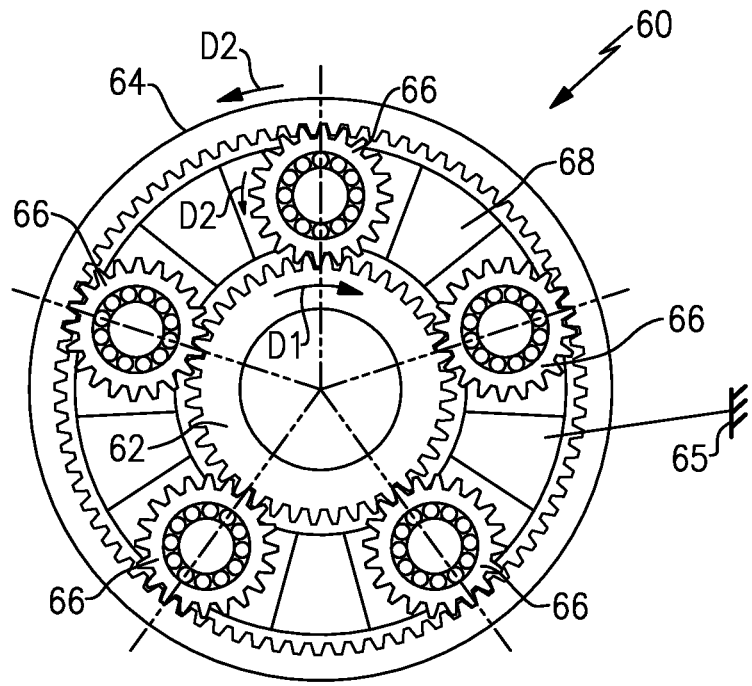
FIG. 2 illustrates an example geared architecture that can be incorporated into the gas turbine engine.

FIG. 2 illustrates the geared architecture 48 including an example star gear assembly 60. In this example, the star gear assembly 60 includes a sun gear 62, a ring gear 64 disposed about the sun gear 62, and circumferentially offset intermediate gears 66, or star gears, positioned between the sun gear 62 and the ring gear 64. A carrier 68 carries the intermediate gears 66. In this embodiment, the carrier 68 is connected to a static structure 65 to prevent rotation.

The sun gear 62 receives an input from the low pressure turbine 46 (see FIG. 1) and rotates in a first direction D1 thereby turning the plurality of intermediate gears 66 in a second direction D2 that is opposite of the first direction D1. Movement of the plurality of intermediate gears 66 is transmitted to the ring gear 64, which can then rotate in the second direction D2 opposite from the first direction D1 of the sun gear 62. The ring gear 64 is connected to the fan 42 for rotation (see FIG. 1).

Figure 3:
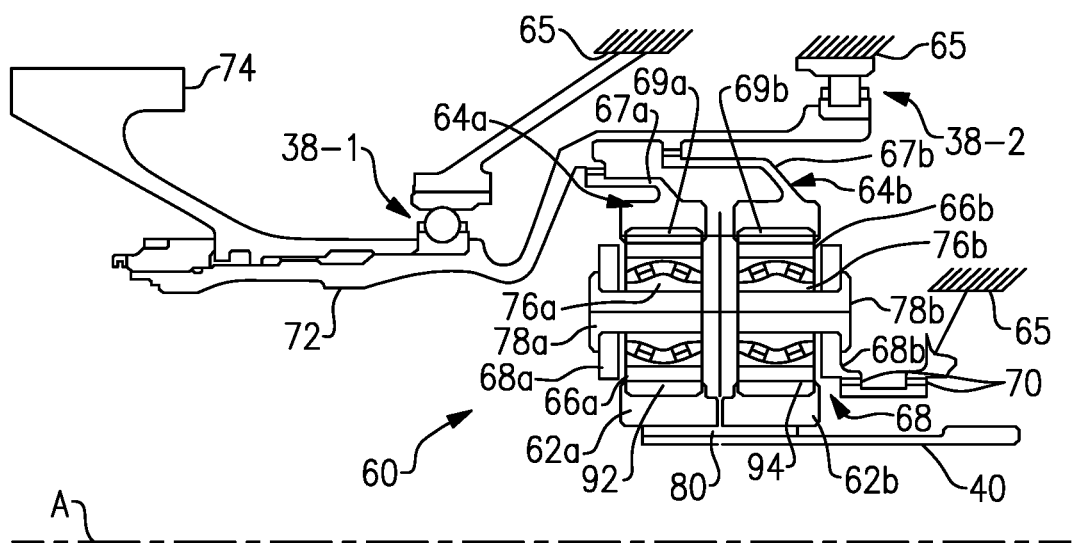
FIG. 3 illustrates the geared architecture of FIG. 2 incorporated into the gas turbine engine.

FIG. 3 illustrates the star gear assembly 60 incorporated into a gas turbine engine 20. In this embodiment, the star gear assembly 60 is an epicyclic gear system with the carrier 68 attached to the static structure 65 with a spline 70 that fixes the carrier 68 from rotation.

A fan drive shaft 72 is attached to a first ring gear 64a and a second ring gear 64b. The fan drive shaft 72 is supported by bearing systems 38-1 and 38-2, such as a ball bearings or roller bearings, located between the static structure 65 and the drive shaft 72. In this example, the bearing system 38-1 is generally located between the star gear assembly 60 and a fan hub 74 and the bearing system 38-2 is generally located aft and radially outward from the star gear assembly 60. The bearing system 38-2 could be located at various locations adjacent to the star gear assembly 60, such as radially inward of the carrier 68.

A first set of intermediate gears 66a having spherical bearings 76a is located adjacent a first plate 68a of the carrier 68. In this example, the first set of intermediate gears 66a are spur gears. Spherical bearings 76a permit angular rotation of the first set of intermediate gears 66a in multiple orthogonal directions. A post 78a extends through post openings 100 (FIG. 7) in the first plate 68a to connect the first set of intermediate gears 66a and spherical bearings 76a to the carrier 68.

A second set of intermediate gears 66b having spherical bearings 76b is located adjacent a second plate 68b of the carrier 68. In this example, the second set of intermediate gears 66b are spur gears. Spherical bearings 76b permit angular rotation of the second set of intermediate gears 66b in multiple orthogonal directions. A post 78b extends through post openings 100 (FIG. 7) in the second plate 68b to connect the second set of intermediate gears 66b and spherical bearings 76b to the carrier 68.

The first set of intermediate gears 66a are axially spaced from the second set of intermediate gears 66b and rotate independently of each other. An axis of rotation of at least one of the first set of intermediate gears 66a is substantially aligned with an axis of rotation of at least one of the second set of intermediate gears 66b.

The first set of intermediate gears 66a engage a first set of teeth 69a extending from a first flexible flange 67a on the first ring gear 64a and a first row of teeth 92 on a first sun gear 62a. The second set of intermediate gears 66b engage a second set of teeth 69b extending from a second flexible flange 67b on the second ring gear 64b and a second row of teeth 94 on a second sun gear 62b. The first and second flexible flanges 67a and 67b have a stiffness that is less than a stiffness of the static structure 65.

The first and second set of intermediate gears 66a and 66b engage the first and second ring gears 64a and 64b on a first side and the first and second sun gears 62a and 62b, respectively, on a second opposite side that is radially inward relative to the engine axis of rotation A.

The first and second sun gears 62a and 62b are attached with a common splined connection 80 to the inner shaft 40 to receive an input from the low pressure turbine 46. Although the example embodiment illustrates sun gears 62a and 62b attached to the low pressure turbine shaft 40 through splines 80, it can be appreciated that one skilled in the art could conceivably make this attachment with a variety of mechanical connections such as pins, bolts, flanges or tangs. It could also be conceived that either one of the sun gears 62a or 62b could be permanently attached to low pressure turbine shaft 40 while the other sun gear 62a or 62b is flexibly mounted to spline 80 or some other alternate mechanical connection to low turbine shaft 40.

The star gear assembly 60 is capable of carrying separate loads between the first set of intermediate gears 66a, the first ring gear 64a, and the first sun gear 62a, and the second set of intermediate gears 66b, the second ring gear 64b, and the second sun gear 62b, because of the axial separation between the respective elements. For example, when the first plate 68a on the carrier 68 is rotated relative to the second plate 68b on the carrier 68, a first load is transferred through the first ring gear 64a, the first set of intermediate gears 66a, and the first sun gear 62a, and a second load is transferred independently of the first load through the second ring gear 64b, the second set of intermediate gears 66b, and the second sun gear 62b.

Figure 4:
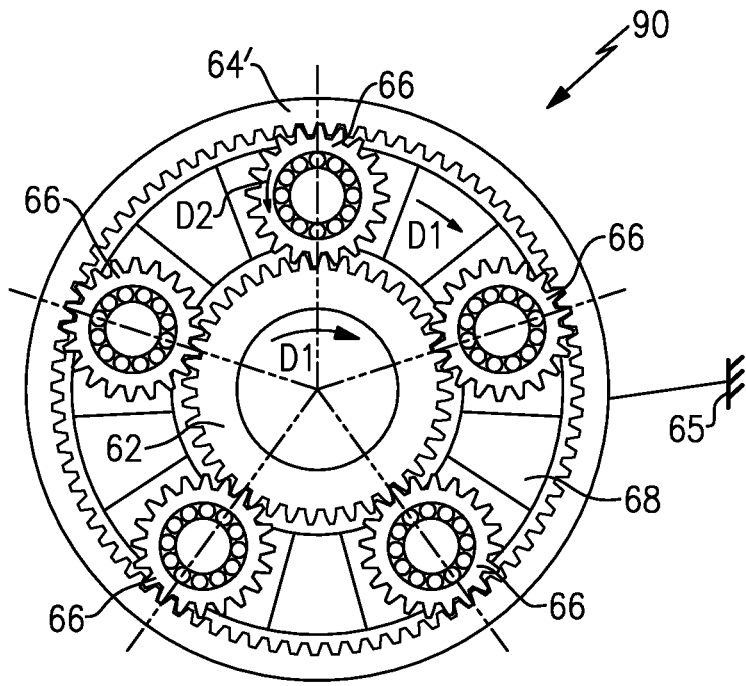
FIG. 4 illustrates another example geared architecture that can be incorporated into the gas turbine engine.

FIG. 4 illustrates the geared architecture 48 including an example planetary gear assembly 90. The planetary gear assembly 90 is similar to the star gear assembly 60 except where noted below. In this example, the planetary gear assembly 90 includes a sun gear 62, a ring gear 64' disposed about the sun gear 62, and the circumferentially offset intermediate gears 66, or planet gears, positioned between the sun gear 62 and the fixed ring gear 64'. A carrier 68' carries and is attached to each of the intermediate gears 66. In this embodiment, the ring gear 64' does not rotate and is connected to the static structure 65 of the gas turbine engine 20.

The sun gear 62 receives an input from the low pressure turbine 46 (see FIG. 1) and rotates in a first direction D1 thereby turning the intermediate gears 66 in a second direction D2 that is opposite of the first direction D1. Movement of the intermediate gears 66 is transmitted to the carrier 68', which rotates in the first direction D1. The carrier 68' is connected to the fan 42 for rotating the fan 42 (see FIG. 1) in the first direction D1.

Figure 5:
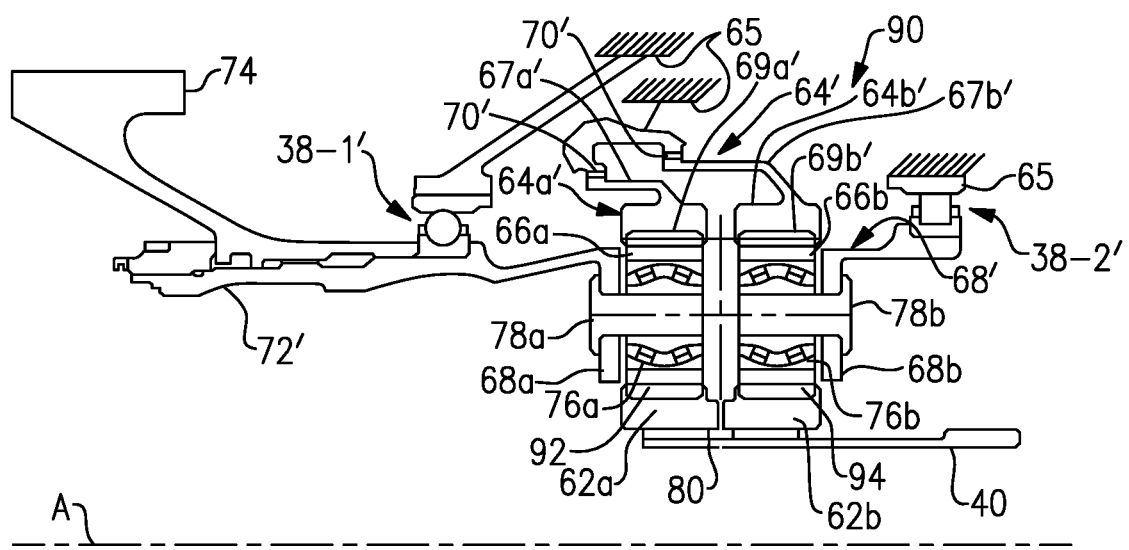
FIG. 5 illustrates the geared architecture of FIG. 4 incorporated into the gas turbine engine.

FIG. 5 illustrates an example planetary gear assembly 90 incorporated into a gas turbine engine 20. In this embodiment, the planetary gear assembly 90 is an epicyclic gear system with a first ring gear 64*b*' and a second ring gear 64*b*' attached to the static structure 65 with a spline 70' and fixed from rotation.

Fan drive shaft 72' is attached to the carrier 68' and supported by bearing system 38-1', such as a ball bearing or roller bearing, located between the static structure 65 and the drive shaft 72'. The bearing system 38-1' is generally located between the planetary gear assembly 90 and the fan hub 74. In this example, a bearing system 38-2', such as a ball bearing or roller bearing, is located on the carrier 68' generally aft and radially outward from the planetary gear assembly 90. However, the bearing system 38-2' could be located at various locations adjacent the planetary gear assembly 90.

The first set of intermediate gears 66*a* are axially spaced from the second set of intermediate gears 66*b* and rotate independently of each other. The first set of intermediate gears 66*a* engage a first set of teeth 69*a*' extending from a first flexible flange 67*a*' on the first ring gear 64*a*' and a first row of teeth 92 on the first sun gear 62*a*. The second set of intermediate gears 66*b* engage a second set of teeth 69*b*' extending from a second flexible flange 67*b*' on the second ring gear 64*b*' and the second row of teeth 94 on the second sun gear 62*b*. The first and second set of intermediate gears 66*a* and 66*b* engage the first and second ring gears 64*a*' and 64*b*' on a first side and the first and second sun gears 62*a* and 62*b*, respectively, on a second opposite side that is radially inward relative to the engine axis of rotation A.

Figure 6:
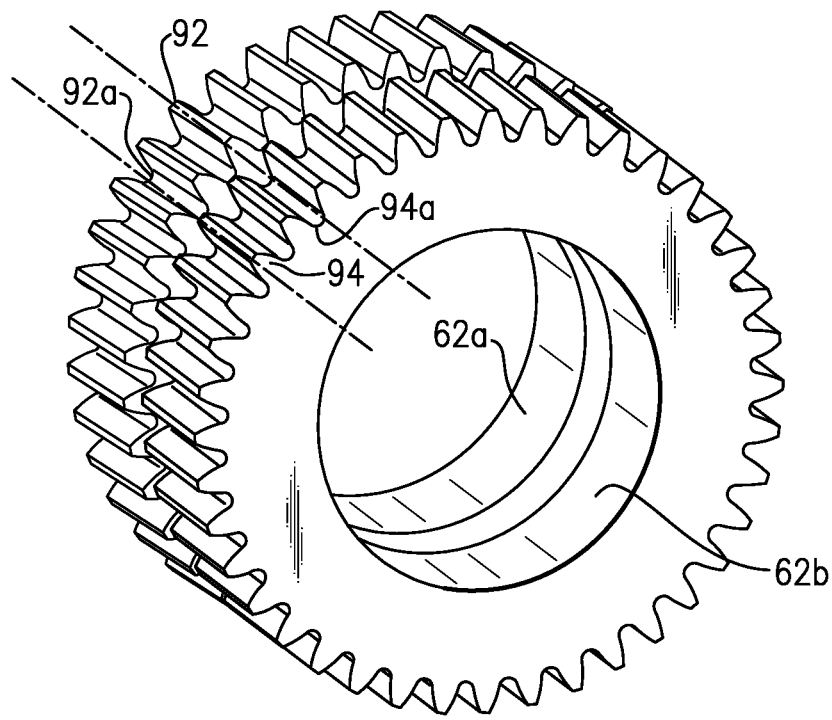
FIG. 6 is a perspective view of an example sun gear.

FIG. 6 illustrates the first sun gear 62*a* including the first row of teeth 92 and the second sun gear 62*b* including the second row of teeth 94 spaced from the first row of teeth 92. In this example, the first and second sun gears 62*a* and 62*b* are aligned circumferentially on a common spline 80 as shown in FIGS. 3 and 5. The first row of teeth 92 are clocked from the second row of teeth 94 such that a tooth root 92*a* on the first row of teeth 92 is aligned with a tooth on the second row of teeth 94. Conversely, a tooth root 94*a* on the second row of teeth 94 is aligned with a tooth on the first row of teeth 92. By clocking the first row of teeth 92 relative to the second row of teeth 94, vibration of the geared architecture 48 is reduced by decreasing the number of teeth 92 and 94 in meshing engagement at a single time.

Figure 7:
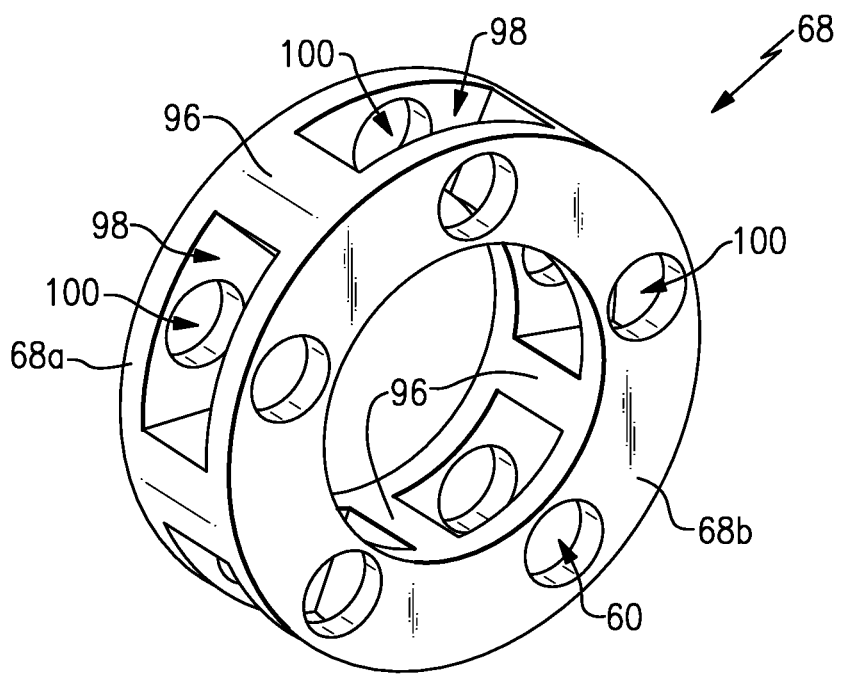
FIG. 7 is a perspective view of an example carrier.

FIG. 7 illustrates the carrier 68. A radially outer connector 96 extends between the first plate 68*a* and the second plate 68*b*. In this example, the connector 96 are solid continuous pieces of material that are free of fluid passageways. However, in another example, the connect 96 could include passages for delivering a fluid. The connector 96 may be made of a separate piece of material and attached to the first plate 68*a* and the second plate 68*b* by bonding, welding, or mechanical connection. Alternatively, the connector 96, the first plate 68*a*, and the second plate 68*b* could be made of a single unitary piece of material.

Intermediate gear openings 98 are circumferentially spaced around a perimeter of the carrier 68 and are defined by the connectors 96, the first plate 68*a*, and the second plate 68*b*. The intermediate gear openings 98 are sized to each accept one of the first set of intermediate gears 66*a* adjacent the first plate 68*a* and one of the second set of intermediate gears 66*b* adjacent the second plate 68*b*. The posts 78 extend through post openings 100 in the first plate 68*a* and the second plate 68*b* to secure the intermediates gears 66 to the carrier 68.

Figure 8:
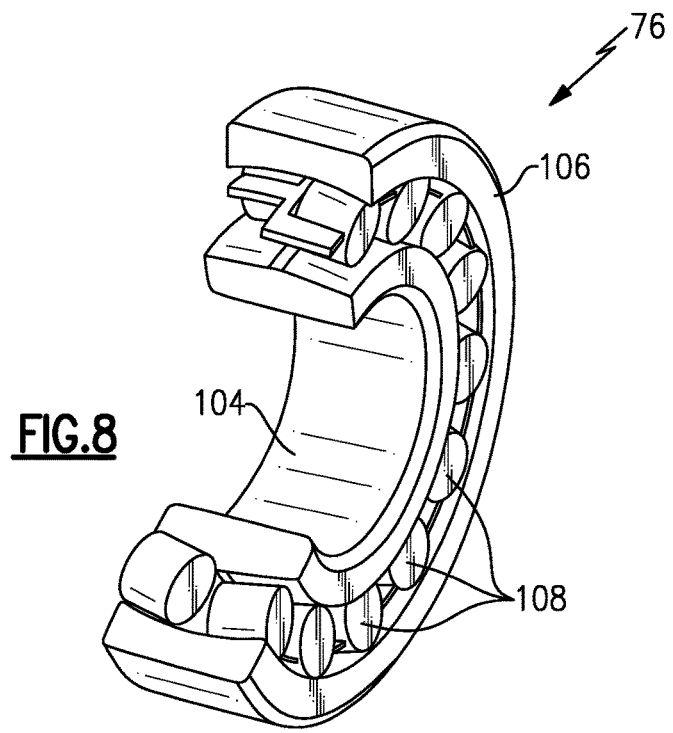
FIG. 8 is a perspective cross-sectional view of a spherical gear.

FIG. 8 illustrates an example spherical bearing 76 including an inner race 104 for engaging the post 78, an outer race 106 for engaging the intermediate gear 66, and roller bearings 108 located between the inner race 104 and the outer race 106. Spherical bearings 76 allow the inner race 104 to rotate in a direction orthogonal to the outer race 106.

Figure 9:
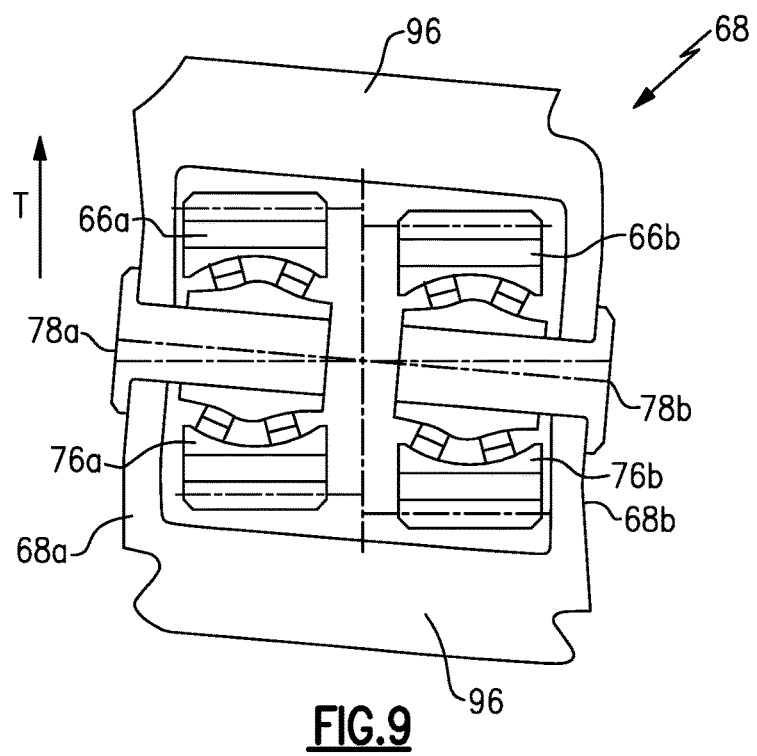
FIG. 9 illustrates the carrier under a torsional load.

FIG. 9 illustrates deformation of the carrier 68 during application of a torsional force. When torsional force T is applied in the direction as shown in FIG. 9, the carrier 68 flexes in response to the force. The flexing of the carrier 68 can lead the intermediate gears 66 to move out of alignment with the ring gear 64 or the sun gear 62. Because the spherical bearings 76 allow for rotation in multiple orthogonal directions, the spherical bearings 76 are able to maintain the first and second set of intermediate gears 66*a* and 66*b* in alignment with the first and second ring gears 64*a* and 64*b* and the first and second sun gears 62*a* and 62*b* even when the carrier 68 is being deformed by the torsional force. Additionally, the first flexible flange 67*a* and 67*a*' and the second flexible flange 67*b* and 67*b*' provide flexibility to the first ring gear 64*a*/*a*' and the second ring gear 64*b*/*b*', respectively, to further maintain alignment with the intermediate gears 66 during flexure of the carrier 68.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An epicyclic gear assembly comprising:
    a carrier including a first plate axially spaced from a second plate;
    a first epicyclic gear set including a first set of intermediate gear teeth in meshing engagement with a first set of sun gear teeth and a first set of ring gear teeth, wherein the first plate is configured to rotate with an output of the epicyclic gear assembly;
    a second epicyclic gear set including a second set of intermediate gear teeth in meshing engagement with a second set of sun gear teeth and a second set of ring gear teeth; and
    a first bearing race attached to the first plate for supporting a first bearing and a second bearing race attached to the second plate for supporting a second bearing;
    wherein the first set of ring gear teeth extend from a first ring gear having a first flexible attachment and the second set of ring gear teeth extend from a second ring gear having a second flexible attachment;
    wherein the first set of sun gear teeth includes teeth that are clocked relative to the second set of sun gear teeth and align with a set of tooth roots between the second set of sun gear teeth.

2. The assembly of claim 1, wherein the first set of intermediate gear teeth and the second set of intermediate gear teeth are spur gear teeth.

3. The assembly of claim 1, wherein the epicyclic gear assembly is a planetary gear assembly with the first ring gear and the second ring gear fixed from rotation.

4. The assembly of claim 1, wherein the first set of intermediate gear teeth are rotatably connected to the first plate by at least one first post and at least one of the second set of intermediate gear teeth are rotatably connected to the second plate by at least one second post.

5. The assembly of claim 4, including at least one first spherical bearing located between the at least one first post and the at least one of the first set of intermediate gear teeth and at least one second spherical bearing located between at least one second post and the at least one second set of intermediate gear teeth.

6. An epicyclic gear assembly comprising:
a carrier including a first plate axially spaced from a second plate;
a first epicyclic gear set including a first set of intermediate gear teeth in meshing engagement with a first set of sun gear teeth and a first set of ring gear teeth; and
a second epicyclic gear set includes a second set of intermediate gear teeth in meshing engagement with a second set of sun gear teeth and a second set of ring gear teeth;
wherein the first set of sun gear teeth includes teeth that are clocked relative to the second set of sun gear teeth and align with a set of tooth roots between the second set of sun gear teeth;
wherein an output of the first and second epicyclic gear sets includes a flexible connection.

7. The assembly of claim 6, wherein the first set of ring gear teeth extend from a first ring gear and the second set of ring gear teeth extend from a second ring gear and the output having a flexible connection includes a first flexible connection with the first ring gear and a second flexible connection with the second ring gear.

8. A gas turbine engine comprising:
a fan section rotatable about an axis;
a turbine section having a fan drive turbine; and
a speed change mechanism in communication with the fan section and the turbine section, the speed change mechanism including:
a carrier including a first plate axially spaced from a second plate;
a first epicyclic gear set including a first set of intermediate gear teeth in meshing engagement with a first set of sun gear teeth and a first set of ring gear teeth;
a second epicyclic gear set including a second set of intermediate gear teeth in meshing engagement with a second set of sun gear teeth and a second set of ring gear teeth, wherein the first and second epicyclic gear sets are located between the first plate and the second plate and the first plate is configured to rotate with an output of the speed change mechanism;
a first bearing assembly attached to the first plate for supporting the first plate relative to an engine static structure; and
a second bearing assembly attached to the second plate for supporting the second plate relative to the engine static structure;
wherein the first set of ring gear teeth extend from a first ring gear having a first flexible attachment and the second set of ring gear teeth extend from a second ring gear having a second flexible attachment;
wherein the first set of sun gear teeth includes teeth that are clocked the second set of sun gear teeth and align with a set of tooth roots between the second set of ring gear teeth.

9. The gas turbine engine of claim 8, wherein the first set of intermediate gear teeth and the second set of intermediate gear teeth are spur gear teeth.

10. The gas turbine engine of claim 8, wherein the speed change mechanism is a planetary gear assembly with the first ring gear and the second ring gear fixed from rotation relative to an engine static structure.

11. The gas turbine engine of claim 8, wherein the first set of intermediate gear teeth are rotatably connected to the first plate by at least one first post and at least one of the second set of intermediate gear teeth are rotatably connected to the second plate by at least one second post.

12. The gas turbine engine of claim 11, including at least one first spherical bearing located between the at least one first post and the at least one of the first set of intermediate gear teeth and at least one second spherical bearing located between at least one second post and the at least one second set of intermediate gear teeth.

* * * * *